United States Patent
Miki et al.

(10) Patent No.: US 12,018,098 B2
(45) Date of Patent: Jun. 25, 2024

(54) METHOD FOR PRODUCING DEPOLYMERIZED CELLULOSE ETHER

(71) Applicant: Shin-Etsu Chemical Co., Ltd., Tokyo (JP)

(72) Inventors: Kentaro Miki, Joetsu (JP); Akira Kitamura, Niigata (JP); Mitsuo Narita, Niigata (JP)

(73) Assignee: SHIN-ETSU CHEMICAL CO., LTD., Toyko (JP)

( * ) Notice: Subject to any disclaimer, the term of this patent is extended or adjusted under 35 U.S.C. 154(b) by 0 days.

(21) Appl. No.: 17/505,920

(22) Filed: Oct. 20, 2021

(65) Prior Publication Data
US 2022/0127379 A1    Apr. 28, 2022

(30) Foreign Application Priority Data
Oct. 22, 2020   (JP) ................................. 2020-177484

(51) Int. Cl.
*C08B 11/20*   (2006.01)

(52) U.S. Cl.
CPC ..................... *C08B 11/20* (2013.01)

(58) Field of Classification Search
CPC .......................................................... C08B 11/20
See application file for complete search history.

(56) References Cited

U.S. PATENT DOCUMENTS

| | | |
|---|---|---|
| 3,391,135 A | 7/1968 | Shigeru et al. |
| 10,906,992 B2 * | 2/2021 | Kitaguchi ............... C08B 11/08 |
| 2014/0148591 A1 | 5/2014 | Engleman et al. |

FOREIGN PATENT DOCUMENTS

| | | |
|---|---|---|
| EP | 0210917 A2 | 2/1987 |
| EP | 1130033 A1 | 9/2001 |
| JP | S6225101 Y2 | 6/1987 |
| JP | 2009540098 A | 11/2009 |
| WO | 0032637 A1 | 6/2000 |
| WO | 0063254 A1 | 10/2000 |
| WO | 2007145709 A1 | 12/2007 |

OTHER PUBLICATIONS

Extended European Search Report corresponding to European Patent Application No. 21203961.4 (6 pages) (dated Mar. 17, 2022).
U.S. Appl. No. 17/505,926, filed Oct. 20, 2021, Inada et al..

* cited by examiner

*Primary Examiner* — Leigh C Maier
(74) *Attorney, Agent, or Firm* — Myers Bigel, P.A.

(57) ABSTRACT

There is provided a method for producing a depolymerized cellulose ether, the method suppressing the formation of coarse aggregates during the contact with an acid aqueous solution in a depolymerization reaction, and reducing the amounts of aggregates and black contaminants, while suppressing yellowness. More specifically, there is provided a method for producing a depolymerized cellulose ether, the method including a depolymerization step of depolymerizing a cellulose ether by bring the cellulose ether of 45 to 95° C. into contact with an acid aqueous solution of 55 to 98° C. to obtain a depolymerized cellulose ether.

12 Claims, No Drawings

METHOD FOR PRODUCING DEPOLYMERIZED CELLULOSE ETHER

BACKGROUND OF INVENTION

1. Field of the Invention

The invention relates to a method for producing a depolymerized cellulose ether in which the depolymerized cellulose ether is obtained by depolymerizing a cellulose ether.

2. Related Art

A cellulose ether having a low degree of polymerization is used, for example, as film coating with respect to a solid preparation such as a tablet. Such film coating is made for masking the unpleasant taste of the drug as well as preventing deterioration of the drug or controlling the elution behavior in the digestive organs after administration.

Generally, a cellulose ether having a low degree of polymerization is obtained by depolymerizing a cellulose ether having a high degree of polymerization. The depolymerization with an acid such as hydrogen chloride is widely used. It is also known that the obtained cellulose ether having a low degree of polymerization has higher yellowness than that of the starting cellulose ether having a high degree of polymerization.

In order to suppress the yellowness, there is provided a method for producing a cellulose ether having a low degree of polymerization, the method comprising steps of: bringing a powdery water-soluble cellulose ether having a high degree of polymerization into contact with an aqueous solution of hydrogen chloride, where an amount of the hydrogen chloride is 0.1 to 1% by weight relative to the weight of the cellulose ether and the water content of the reaction system is 3 to K % by weight; placing the resulting mixture in a reactor for reaction at 40 to 85° C.; and then removing hydrogen chloride (JPS62-025101A). Since neither the internal temperature of the reactor nor reference to heating is described, the contact between the cellulose ether and the aqueous solution of hydrogen chloride as well as mixing for the reaction are considered to be carried out at room temperature.

SUMMARY OF THE INVENTION

However, in the method of using the aqueous solution of hydrogen chloride, where an amount of the hydrogen chloride is 0.1 to 1% by weight and the water content of the reaction system is 3 to 8% by weight, the yellowness of the obtained cellulose ether having a low polymerization degree is suppressed, but coarse aggregates may be generated when the aqueous solution of hydrogen chloride is added. The coarse aggregates may remain as aggregates even after the depolymerization, so that the quality of the produced cellulose ether having a low degree of polymerization is deteriorated. Alternatively, the coarse aggregates may be excessively depolymerized during the depolymerization reaction to become black, and then disintegrated in a step after the depolymerization reaction, so that the quality of the cellulose ether having a low degree of polymerization may be deteriorated because of the presence of black contaminants. Thus, there is room for improvement.

In view of the above circumstances, an object of the invention is to provide a method for producing a depolymerized cellulose ether, where the formation of coarse aggregates is suppressed during the contact with an aqueous solution of acid, and the amounts of aggregates and black contaminants are reduced, while suppressing yellowness.

As a result of extensive studies to achieve the object, the inventors have found that, by controlling the temperature at which the cellulose ether and the aqueous solution of acid are brought into contact with each other, a depolymerized cellulose ether can be produced, while suppressing the formation of coarse aggregates during the contact between the cellulose ether and the aqueous solution of acid, reducing the amounts of aggregates and black contaminants, and suppressing the yellowness; and thus has completed the invention.

In an aspect of the invention, there is provided a method for producing a depolymerized cellulose ether the method comprising a step of depolymerizing a cellulose ether by bringing the cellulose ether of 45 to 95° C. into contact with an acid aqueous solution of 55 to 98° C. to obtain a depolymerized cellulose ether.

It should be noted that a depolymerized cellulose ether has a lower degree of polymerization than a pre-depolymerization cellulose ether, and may include a cellulose ether having a low degree of polymerization to be used, for example, for film coating with respect to a solid preparation such as a tablet.

According to the invention, a depolymerized cellulose ether can be produced, while suppressing the formation of coarse aggregates during the contact with an aqueous solution of an acid, reducing the amounts of aggregates and black contaminants, and suppressing yellowness.

DETAILED DESCRIPTION OF THE PREFERRED EMBODIMENTS

The depolymerized cellulose ether is obtained through depolymerization of a cellulose ether by bringing the cellulose ether of from 45 to 95° C. into contact with an acid aqueous solution of from 55 to 98° C.

The temperature of the pre-depolymerization cellulose ether to be subjected to depolymerization is from 45 to 95° C., preferably from 60 to 90° C., more preferably from 63 to 87° C., and still more preferably from 65 to 85° C. When the temperature is less than 45° C., the generated amounts of coarse aggregates and black contaminants increase. When the temperature is more than 95° C., a depolymerized cellulose ether having low yellowness cannot be obtained.

The method of heating the cellulose ether to be depolymerized is not particularly limited. Examples of the method of heating the cellulose ether include a method in which the cellulose ether is placed in a reactor equipped with a jacket, and heated through hot water or steam in a jacket; a method in which the cellulose ether is heated by allowing heated air, nitrogen or the like to pass through the cellulose ether.

The temperature of the cellulose ether to be depolymerized may be controlled, for example, by controlling the jacket temperature of the reactor for carrying out the depolymerization.

Examples of the cellulose ether include a hydroxyalkyl alkyl cellulose, an alkyl cellulose and a hydroxyalkyl cellulose.

Examples of the hydroxyalkyl alkyl cellulose include hydroxypropyl methyl cellulose (hereinafter, also described as "HPMC") having a hydroxypropoxy group content of preferably from 4.0 to 13.0% by mass and a methoxy group content of preferably from 19.0 to 32.0% by mass; hydroxyethyl methyl cellulose having a hydroxyethoxy group content of preferably from 4.0 to 15.0% by mass and a methoxy group content of preferably from 20.0 to 26.0% by mass; and hydroxyethyl ethyl cellulose having a hydroxyethoxy group content of preferably from 8.0 to 20.0% by mass and an ethoxy group content of preferably from 20.0 to 38.0% by mass.

Examples of the alkyl cellulose include methyl cellulose (hereinafter, also referred to as "MC") having a methoxy group content of preferably from 18.0 to 36.0% by mass; mid ethyl cellulose having an ethoxy group content of preferably 40.0 to 50.0% by mass.

Examples of the hydroxyalkyl cellulose include hydroxyethyl cellulose having a hydroxyethoxy group content of preferably 2.0 to 70.0% by mass; and hydroxypropyl cellulose having a hydroxypropoxy group content of preferably 2.0 to 70.0% by mass.

The contents of alkoxy groups and hydroxyalkoxy groups in an alkyl cellulose, a hydroxyalkyl cellulose and a hydroxyalkyl alkyl cellulose may be determined in accordance with the assay in "Hypromellose" of the Japanese Pharmacopoeia Seventeenth Edition.

The viscosity at 20° C. of the 2% by mass aqueous solution of the cellulose ether to be depolymerized is preferably from 400 to 200,000 mPa·s, more preferably from 400 to 150,000 mPa·s, and still more preferably from 400 to 100,000 mPa·s, from the viewpoint of washability of the cellulose ether to be depolymerized.

When the viscosity at 20° C. of a 2% by mass aqueous solution of cellulose ether is 600 mPa·s or more, the viscosity may be determined by using a single cylinder-type rotational viscometer in accordance with "Viscosity measurement by rotational viscometer" in General Tests of the Japanese Pharmacopoeia Seventeenth Edition. When the viscosity at 20° C. of a 2% by mass aqueous solution of the cellulose ether is less than 600 mPa·s, the viscosity may be determined by using a Ubbelohde-type viscometer in accordance with "Viscosity measurement by capillary tube viscometer" in General Tests of the Japanese Pharmacopoeia Seventeenth Edition.

The cellulose ether to be depolymerized may be produced by a known method. For example, it is produced by a method comprising a step of bringing an alkali metal hydroxide solution into contact with a pulp to obtain alkali cellulose; a step of reacting the alkali cellulose with an etherifying agent to obtain a crude cellulose ether; a step or steps of washing and drying the crude cellulose ether; and an optional pulverization step of pulverizing the washed and dried cellulose ether.

The alkali metal hydroxide solution is not particularly limited. An alkali metal hydroxide aqueous solution is preferable from the viewpoint of economy. The alkali metal hydroxide aqueous solution is not particularly limited. A sodium hydroxide aqueous solution is preferable from the viewpoint of economy.

The etherifying agent is not particularly limited. Examples thereof include an alkyl halide such as methyl chloride and ethyl chloride; and an alkylene oxide such as ethylene oxide and propylene oxide.

The water content of the cellulose ether to be depolymerized is preferably more than 0 and not more than 2.00% by mass, and more preferably from 0.1 to 1.50% by mass, from the viewpoint of preventing aggregation of the cellulose ether.

The water content is defined as {(total mass of cellulose ether–absolutely dry mass of cellulose ether)/(total mass of cellulose ether)}×100%.

Herein, the term "total mass of cellulose ether" means the accurately measured mass of the cellulose ether before dried in accordance with "Loss on Drying Test" of the Japanese Pharmacopoeia Seventeenth Edition. The term "absolutely dry mass of cellulose ether" means the mass of cellulose ether dried in accordance with the "Loss on Drying Test" of the Japanese Pharmacopoeia Seventeenth Edition.

The acid aqueous solution to be contacted with the cellulose ether has a temperature of from 55 to 98° C., preferably from 60 to 95° C., more preferably from 63 to 90° C., and still more preferably from 65 to 85° C. When the acid aqueous solution has a temperature of less than 55° C., the generated amounts of coarse aggregates and black contaminants increase. When the acid aqueous solution has a temperature of more than 98° C., a depolymerized cellulose ether having a low yellowness cannot be obtained.

The temperature of the acid aqueous solution just before contact with the cellulose ether may be measured, for example, using a thermometer.

The method of heating the acid aqueous solution is not particularly limited. Examples of the method of heating the acid aqueous solution include a method in which the acid aqueous solution is placed in a container with a jacket, and heated through hot water or steam in the jacket; and a method in which the acid aqueous solution is placed in a container with an electric heater, and heated by energizing the electric heater. Examples of a method for bringing the cellulose ether of from 45 to 95° C. with the acid aqueous solution of from 55 to 98° C. includes a method in which the acid aqueous solution is added to the cellulose ether which is being stirred, for example, in a mixer; and a method in which the cellulose ether is added to the acid aqueous solution which is being stirred, for example, in a mixer. The method in which the acid aqueous solution is added to the cellulose ether which is being stirred, for example, in a mixer, is preferable from the viewpoint of uniform contact between the cellulose ether and the acid aqueous solution. In this method, the cellulose ether is stirred at a rate of preferably from 1 to 1000 rpm from the viewpoint of uniform mixing of the cellulose ether to be depolymerized with the acid aqueous solution, and the acid in the acid aqueous solution is added at an addition rate of preferably from 0.01 to 1.0% by mass/min when the absolutely dry mass of the cellulose ether to be depolymerized is regarded as 1 (i.e., 100%), from the viewpoint of uniform mixing of the cellulose ether to be depolymerized with the acid aqueous solution.

Examples of the mixer include a reactor to be used for the later-described depolymerization of cellulose ether.

Examples of the acid aqueous solution to be used for the depolymerization include a hydrogen halide aqueous solution such as a hydrogen chloride aqueous solution, a hydrogen bromide aqueous solution and a hydrogen iodide aqueous solution. The hydrogen chloride aqueous solution (hereinafter, also described as "hydrochloric acid") is preferable from the viewpoint of easy acid removal after the depolymerization.

An amount of the acid aqueous solution to be used may be calculated based on a concentration of the acid in the acid aqueous solution and an amount of the acid to be used.

The concentration of the acid in the acid aqueous solution is preferably more than 0 and not more than 35% by mass, and more preferably from 5 to 20% by mass, from the viewpoint of controlling the viscosity of the depolymerized cellulose ether.

The amount of the acid to be used may be selected by multiplying the absolutely dry mass of the pre-depolymerization cellulose ether, by preferably 0.05 to 3.00% by mass and more preferably 0.1.0 to 1.50% by mass, from the viewpoint of controlling the viscosity of the cellulose ether obtained by depolymerization. The absolutely dry mass of cellulose ether may be determined by subtracting the mass of water contained in the cellulose ether from the mass of the cellulose ether. The water content of the cellulose ether may be determined in accordance with "Loss on Drying Test" in General Tests of the Japanese Pharmacopoeia Seventeenth Edition.

Examples of the method of adding the acid aqueous solution include spraying, showering, and dropping of the acid aqueous solution.

In particular, by bring the cellulose ether of fro 45 to 95° C., preferably from 60 to 90° C., more preferably from 63 to 87° C., and still more preferably from 65 to 85° C., into contact with the acid aqueous solution of from 55 to 98° C., preferably from 60 to 95° C., more preferably from 63 to 90° C., and still more preferably from 65 to 85° C. to depolymerize the cellulose ether, the amounts of coarse aggregates and black contaminants can be reduced.

During the addition of the acid aqueous solution, the cellulose ether preferably maintains a temperature adjusted just before the addition of the acid aqueous solution. The cellulose ether to be brought into contact with the acid aqueous solution and the acid aqueous solution preferably have the same temperature, for example, from 65 to 85° C., from the viewpoint of maintaining the temperature of the cellulose ether at the same temperature before and after the contact with the acid aqueous solution.

The water content in the depolymerization reaction of the depolymerization step is preferably 1.0 to 5.0% by mass, more preferably 1.5 to 4.0% by mass, from the viewpoint of allowing a cellulose ether after depolymerization to have low yellowness. Herein, the water content in the depolymerization reaction is a mass percentage of water in the total mass of the depolymerization reaction. When the water content in the depolymerization reaction is less than 1.0% by mass, a depolymerized cellulose ether having low yellowness may not be obtained. When the water content is more than 5% by mass, an amount of the generated aggregates may increase.

When the cellulose ether and the acid aqueous solution are solely present at the start of the depolymerization reaction, the water content in the depolymerization reaction of the depolymerization step is represented by a ratio of the mass of water during the depolymerization reaction to the total mass of the acid aqueous solution and the cellulose ether. This may be expressed by the following.

[{the mass of water (kg) in the pre-depolymerization cellulose ether +the mass of water (kg) in the acid aqueous solution (kg)}/{the total mass (kg) of the pre-depolymerization cellulose ether and the acid aqueous solution}]×100.

The total mass (kg) of the pre-depolymerization cellulose ether and the acid aqueous solution is a sure of the mass (kg) of the pre-depolymerization cellulose ether and the mass (kg) of the acid aqueous solution. When an optional component other than the cellulose ether and the acid aqueous solution is present at the start of the depolymerization reaction, the water content in the depolymerization reaction of the depolymerization step may be calculated in consideration of the water content of the optional component and the total mass including the optional component. Examples of the optional component other than the cellulose ether and the acid aqueous solution include an alcohol having two or less carbon atoms such as methanol and ethanol.

The depolymerization step can be carried out, for example, in a reactor.

The reactor to be used for the depolymerization of cellulose ether is not particularly limited. The reactor is preferably a reactor capable of allowing the cellulose ether particles to be uniformly stirred in the reactor from the viewpoint of uniform depolymerization, and examples thereof include a double cone type rotary reactor, an oblique cylinder type rotary reactor, an internal stirring reactor, and a fluidized bed reactor. In addition, the reactor to be used for the depolymerization of cellulose ether is preferably jacketed from the viewpoint of controlling the reaction temperature during the depolymerization. Two or more reactors may be used at the same in the depolymerization step.

The reaction temperature in the depolymerization step is substantially the temperature at which the cellulose ether of from 45 to 95° C. is brough into contact with the acid aqueous solution of from 55 to 98° C. After the contact, there may be provided an optional step of heating the obtained contact mixture to complete the depolymerization. The heating temperature is preferably from 45 to 120° C., more preferably from 60 to 100° C., from the viewpoint of controlling the viscosity of the depolymerized cellulose ether. When the cellulose ether is brought into contact with the acid aqueous solution, each temperature of the cellulose ether and the acid aqueous solution may be different from the reaction temperature in the depolymerization step from the viewpoint of controlling the rate of the depolymerization reaction.

The depolymerization time in the depolymerization step is not particularly limited as long as the cellulose ether after depolymerization reaches a desired viscosity. The depolymerization time is preferably from 0.1 to 4.0 hours, more preferably from 0.1 to 2.0 hours, from the viewpoint of obtaining a depolymerized cellulose ether having low yellowness. The depolymerization time means a period of time from a start of bringing the pre-depolymerization cellulose ether into contact with the acid aqueous solution to the start of degassing operation described later, or in the case of the absence of degassing operation, to the end of the neutralization by adding an alkali to the depolymerized cellulose ether-containing mixture obtained by the depolymerization.

The addition time of the acid aqueous solution is preferably not more than one half of the depolymerization time from the viewpoint of obtaining a depolymerized cellulose ether having low yellowness.

In order to reduce the residual amount of the acid or the salt generated by the neutralization in the depolymerized cellulose ether after completion of the depolymerization, the inside of the system may be reduced in pressure (degassed) to remove the acid from the depolymerized cellulose ether. For example, when the acid aqueous solution is an aqueous solution of hydrogen chloride, the method for producing a depolymerized cellulose ether may further comprise an optional step of removing hydrogen chloride under reduced pressure after the depolymerization step. The internal pressure of the reactor during degassing is preferably from −60 to −98 kPaG from the viewpoint of efficient removal of the acid.

An optional step of mixing the obtained depolymerized cellulose ether with an alkali to obtain a neutralized depolymerized cellulose ether may be carried out. Examples of the alkali include a weak alkali such as sodium bicarbonate and sodium carbonate. An amount of the alkali to be added is not particularly limited as long as the acid is neutralized.

The neutralized depolymerized cellulose ether may be subjected to an optional pulverization and an optional sieving for passing through a sieve having a desired mesh size.

The viscosity reduction ratio due to depolymerization in the depolymerization step is preferably from 40.0 to 99.99%, more preferably from 50.0 to 99.98% and still more preferably from 60.0 to 99.97%, from the viewpoint of obtaining a depolymerized cellulose ether having low yellowness.

Here, the viscosity reduction ratio for depolymerization means a ratio of the difference in viscosity at 20° C. of a 2% by mass aqueous solution of cellulose ether before and after the depolymerization to the viscosity at 20° C. of a 2% by mass aqueous solution of cellulose ether before the depolymerization. It may be defined as {(viscosity before depolymerization−viscosity after depolymerization)/viscosity before depolymerization}×100.

The viscosity at 20° C. of the 2% by mass aqueous solution of the depolymerized cellulose ether is preferably from 1.0 to 20.0 mPa·s, more preferably from 2.0 to 20.0 mPa·s, and still more preferably 3.0 to 15.0 mPa·s, from the viewpoint of keeping the viscosity of coating solution low during film coating.

EXAMPLES

Hereinafter, the invention will be described in detail with reference to Examples and Comparative Examples. It should not be construed that the invention is limited by or to Examples.

The measurement of yellowness, the evaluation of the amount of generated aggregates, and the evaluation of the amount of generated black contaminants were carried out by the following methods.

<Measurement of Yellowness>

A 2% by mass aqueous solution of depolymerized cellulose ether, the solution having a temperature of 20° C., was prepared, and subjected to the measurement of yellowness with an SM color computer (trade name "SM-4" produced by Suga Test Instruments Co., Ltd.).

<Evaluation of the amount of generated aggregates>

After 100 g of depolymerized cellulose ether is supplied to a Ro-Tap sieve shaker (produced by TAKEDA RIKA KOGYO Co., Ltd.) having a single stage of a 4.7-mesh sieve (effective sieve area of 0.00314 m², opening of 4.00 mm, produced by Kansai Wire Netting Co., Ltd.), sieving is carried out at a rotational speed of 250 rpm and a shaking width of 50 mm without impact by a hammer for 1 minute. The amount of generated aggregates was evaluated by measuring the weight of the residue on the sieve after sieving.

<Evaluation of the amount of generated black contaminants>

After 200 g of depolymerized cellulose ether is supplied to a Ro-Tap sieve shaker (produced by TAKEDA RIKA KOGYO Co., Ltd.) having a singe stage of an 18-mesh sieve (effective sieve area of 0.0314 m², opening of 0.85 mm, produced by Kansai Wire Netting Co., Ltd.), sieving is carried out at a rotational speed of 250 rpm, a shaking width of 50 mm and a hammering frequency of 67 times/minute for 10 minutes. Then, 2.5 g of the depolymerized cellulose ether obtained, as a sieve-passing portion are collected and uniformly spread in a Petri dish having a diameter of 10 cm, and the number of black contaminants having a size of 0.1 mm or more is visually counted. Collection of the depolymerized cellulose ether and measurement of the number of black contaminants, which are described above, are repeated 20 times, and the number of black contaminants per 100 g, which are twice as much as the total amount collected, is defined as the amount of generated black contaminants.

Example 1

The 1.5 kg of HPMC (methoxy group content of 29.0% by mass and hydroxypropoxy group content of 9.1% by mass) was placed in a Plough-Shear type internally stirring reactor (PAM. Apexmixer WB produced by Pacific Machinery & Engineering Co., Ltd.) having an internal volume of 10L, and stirred at the rotational speed of the main shaft of 150 rpm, the rotational speed of the chopper of 1000 rpm, and the jacket temperature of 60° C. for 15 minutes to make the temperature of the HPMC adjusted to 50° C.

Next, 32.1 g of a 14% by mass hydrochloric acid (0.30% by mass as hydrogen chloride relative to the absolutely dry mass of HPMC) of 73° C. adjusted in a hot water bath was added to the reactor dropwise over 30 seconds, while continuously stirring the inside of the reactor, so that the water content in the depolymerization reaction became 2.29% by mass. Then the stirring was continued for additional 5 minutes after the dropwise addition. The temperature of HPMC was from 50 to 55° C. from the start to end of the dropwise addition of the 14% by mass hydrochloric acid.

Then, after completion of the stirring, 500g of the mixture of HPMC and the hydrochloric acid in the Plough-Shear type internally stirring reactor was transferred into a 2L glass reactor (double cone type rotational reactor), and reacted in the glass reactor for 60 minutes, while rotating the inside of the glass reactor and keeping the internal temperature of the glass reactor at 80° C. by heating the glass reactor in a water bath. Thereafter, the inside of the glass reactor was degassed at an internal pressure of −96 kPa to remove the hydrochloric acid, and then the remaining mixture was neutralized by addition of sodium bicarbonate to obtain 500 g of the depolymerized HPMC.

The obtained depolymerization HPMC was subjected to evaluations of the amount of generated aggregates and the number of generated black contaminants. Table 1 shows the properties of HPMC prior to the depolymerization, the depolymerization conditions, and the properties and evaluation results of the obtained depolymerized HPMC.

Examples 2 to 8

A depolymerized HPMC was produced and evaluated in the sane manner as in Example t except that the temperature of the pre-depolymerization cellulose ether and the temperature of the hydrochloric acid were changed to those in Table 1 by changing the jacket temperature and the temperature of the hot water bath. In Examples 2 to 3, the temperature of HPMC from the start to the end of the addition of 14% by mass hydrochloric acid was from 60 to 65° C. In Examples 4 to 8, the temperature of HPMC from the start to the end of the addition of the 14% by mass hydrochloric acid was from 67 to 75° C. The results are shown in Table 1.

Example 9

A depolymerized HPMC was produced and evaluated in the same manner as in Example 1 except that the water content in the depolymerization reaction was changed to that in Table 1 by changing the concentration of the hydrochloric acid from 14% by mass to 8% by mass. The temperature of HPMC from the start to the end of addition of the 8 wt % hydrochloric acid was from 60 to 65° C.

Example 10

A depolymerized MC was produced and evaluated in the same manner as in Example 1 except that the HPMC was changed to MC (methoxy group content of 29.4% by mass). The temperature of MC from the start to the end of the addition of 14 wt % hydrochloric acid was from 70 to 75° C. The results are shown in Table 1.

Comparative Examples 1 to 3

A depolymerized HPMC was produced and evaluated in the same manner as in Example 1 except that the temperature of the pre-depolymerization cellulose ether and the temperature of the hydrochloric acid were changed to those in Table 1 by changing the jacket temperature and the temperature of the hot water bath. The results are shown in Table 1.

Comparative Example 4

A depolymerized HPMC was produced and evaluated in the same manner as in Example 9 except that the temperature of the pre-depolymerization cellulose ether and the temperature of the hydrochloric acid were changed to those in Table 1. The results are shown in Table 1.

It is noted that the depolymerized HPMCs obtained in the Examples and Comparative Examples were in form of powder having a uniform color except for the black contaminants. Thus, it is considered that the depolymerization reactions were carried out not locally but uniformly.

Further, it is evident from the results of Example 10 that the same effects can be achieved even when the type of cellulose ether is changed.

The invention claimed is:

1. A method for producing a depolymerized cellulose ether, the method comprising a step of depolymerizing a cellulose ether by bringing the cellulose ether of 45 to 95° C. into contact with a hydrogen chloride aqueous solution having a temperature of 55 to 98° C. and a concentration of more than 0% by mass and not more than 35% by mass to obtain a depolymerized cellulose ether, wherein the hydrogen chloride aqueous solution is added to the cellulose ether.

2. The method for producing a depolymerized cellulose ether according to claim 1, wherein the temperature of the cellulose ether to be brought into contact with the hydrogen chloride aqueous solution and the temperature of the hydrogen chloride aqueous solution are both in the range of 65 to 85° C.

3. The method for producing a depolymerized cellulose ether according to claim 1, wherein a content of water in a depolymerization reaction of the depolymerization step is 1.0 to 5.0% by mass based on the total mass of the depolymerization reaction.

4. The method for producing a depolymerized cellulose ether according to claim 3, wherein the water in the depolymerization reaction is a total of water in the cellulose ether to be brought into contact with the hydrogen chloride aqueous solution and water in the hydrogen chloride aqueous solution.

5. The method for producing a depolymerized cellulose ether according to claim 1, wherein the cellulose ether is selected from the group consisting of alkyl cellulose, hydroxyalkyl cellulose and hydroxyalkyl alkyl cellulose.

TABLE 1

| | cellulose ether before depolymerization | | | | depolymerization conditions | | | cellulose ether after depolymerization | | |
|---|---|---|---|---|---|---|---|---|---|---|
| | type | viscosity mPa·s | water content % by mass | temperature °C. | hydrochloric acid temperature % | amount of hydrogen chloride % by mass | water content in depolymerization reaction% | viscosity mPa·s | amount of generated aggregates % | amount of generated black contaminants |
| Example1 | HPMC | 1000 | 0.6 | 50 | 73 | 0.30 | 2.29 | 3.0 | 0.5 | 16 |
| Example2 | HPMC | 1000 | 0.5 | 61 | 74 | 0.30 | 2.29 | 3.0 | 0.4 | 14 |
| Example3 | HPMC | 1000 | 0.5 | 61 | 83 | 0.30 | 2.29 | 3.0 | 0.4 | 16 |
| Example4 | HPMC | 1000 | 0.5 | 67 | 70 | 0.30 | 2.29 | 3.0 | 0.0 | 6 |
| Example5 | HPMC | 1000 | 0.5 | 71 | 76 | 0.30 | 2.29 | 3.0 | 0.0 | 4 |
| Example6 | HPMC | 1000 | 0.5 | 71 | 85 | 0.30 | 2.29 | 3.0 | 0.0 | 2 |
| Example7 | HPMC | 1000 | 0.5 | 80 | 81 | 0.30 | 2.29 | 3.0 | 0.0 | 4 |
| Example8 | HPMC | 1000 | 0.5 | 72 | 60 | 0.30 | 2.29 | 3.0 | 0.4 | 14 |
| Example9 | HPMC | 1000 | 0.5 | 50 | 75 | 0.30 | 3.81 | 3.3 | 0.7 | 32 |
| Example10 | MC | 4000 | 1.0 | 71 | 76 | 0.30 | 2.78 | 4.0 | 0.0 | 6 |
| Comp.Ex.1 | HPMC | 1000 | 0.5 | 26 | 22 | 0.30 | 2.29 | 3.0 | 1.3 | 50 |
| Comp.Ex.2 | HPMC | 1000 | 0.5 | 20 | 74 | 0.30 | 2.29 | 3.0 | 1.0 | 46 |
| Comp.Ex.3 | HPMC | 1000 | 0.5 | 70 | 24 | 0.30 | 2.29 | 3.0 | 1.3 | 46 |
| Comp.Ex.4 | HPMC | 1000 | 0.5 | 25 | 22 | 0.30 | 3.81 | 3.3 | 2.7 | 126 |

* "viscosity" means a viscosity at 20° C. of 2% by mass aqueous solution of cellulose ether.
* "amount of hydrogen chloride" means a ratio (%) of mass of hydrogen chloride to absolute dry mass of cellulose ether before depolymerization.

It is evident from the results of Examples 1 to 9 and Comparative Examples 1 to 4 that a depolymerized cellulose ether can be produced, while reducing amounts of generated aggregates and generated black contaminants, and maintaining the suppression of yellowness, by bringing a cellulose ether having a predetermined temperature into contact with an acid aqueous solution having a predetermined temperature for depolymerizing the cellulose ether.

6. The method for producing a depolymerized cellulose ether according to claim 2, wherein a content of water in a depolymerization reaction of the depolymerization step is 1.0 to 5.0% by mass based on the total mass of the depolymerization reaction.

7. The method for producing a depolymerized cellulose ether according to claim 6, wherein the water in the depolymerization reaction is a total of water in the cellulose ether to be brought into contact with the hydrogen chloride aqueous solution and water in the hydrogen chloride aqueous solution.

8. The method for producing a depolymerized cellulose ether according to claim 6, wherein the cellulose ether is selected from the group consisting of alkyl cellulose, hydroxyalkyl cellulose and hydroxyalkyl alkyl cellulose.

9. The method for producing a depolymerized cellulose ether according to claim 7, wherein the cellulose ether is selected from the group consisting of alkyl cellulose, hydroxyalkyl cellulose and hydroxyalkyl alkyl cellulose.

10. The method for producing a depolymerized cellulose ether according to claim 2, wherein the cellulose ether is selected from the group consisting of alkyl cellulose, hydroxyalkyl cellulose and hydroxyalkyl alkyl cellulose.

11. The method for producing a depolymerized cellulose ether according to claim 3, wherein the cellulose ether is selected from the group consisting of alkyl cellulose, hydroxyalkyl cellulose and hydroxyalkyl alkyl cellulose.

12. The method for producing a depolymerized cellulose ether according to claim 4, wherein the cellulose ether is selected from the group consisting of alkyl cellulose, hydroxyalkyl cellulose and hydroxyalkyl alkyl cellulose.

* * * * *

UNITED STATES PATENT AND TRADEMARK OFFICE
CERTIFICATE OF CORRECTION

PATENT NO. : 12,018,098 B2
APPLICATION NO. : 17/505920
DATED : June 25, 2024
INVENTOR(S) : Miki et al.

Page 1 of 2

It is certified that error appears in the above-identified patent and that said Letters Patent is hereby corrected as shown below:

In the Specification

Column 1, Line 36: Please correct "3 to K %" to read --3 to 8%--

Column 3, Line 9: Please correct "mid" to read --and--

Column 4, Line 25: Please insert a paragraph break between "heater." and "Examples"

Column 8, Line 50: Please correct "Example t" to read --Example 1--

Signed and Sealed this
Fifteenth Day of July, 2025

Coke Morgan Stewart
*Acting Director of the United States Patent and Trademark Office*

Columns 9-10, TABLE 1: Please delete TABLE 1 and replace with the following:

Table 1

| | cellulose ether before depolymerization | | | hydrochloric acid | depolymerization conditions | | cellulose ether after depolymerization | | |
|---|---|---|---|---|---|---|---|---|---|
| | type | viscosity | water content | temperature | temperature | amount of hydrogen chloride | water content in depolymerization reaction | viscosity | amount of generated aggregates | amount of generated black contaminants |
| | | mPa·s | % by mass | °C | °C | % by mass | % | mPa·s | % | |
| Example1 | HPMC | 1000 | 9.5 | 50 | 73 | 0.30 | 2.29 | 3.8 | 0.5 | 16 |
| Example2 | HPMC | 1000 | 9.5 | 61 | 74 | 0.30 | 2.29 | 3.8 | 0.4 | 14 |
| Example3 | HPMC | 1000 | 9.5 | 61 | 83 | 0.30 | 2.29 | 3.8 | 0.4 | 16 |
| Example4 | HPMC | 1000 | 9.5 | 67 | 70 | 0.30 | 2.29 | 3.9 | 0.0 | 6 |
| Example5 | HPMC | 1000 | 9.5 | 71 | 76 | 0.30 | 2.29 | 3.8 | 0.0 | 4 |
| Example6 | HPMC | 1000 | 9.5 | 71 | 85 | 0.30 | 2.29 | 3.8 | 0.0 | 2 |
| Example7 | HPMC | 1000 | 9.5 | 80 | 81 | 0.30 | 2.29 | 3.9 | 0.0 | 4 |
| Example8 | HPMC | 1000 | 9.5 | 72 | 80 | 0.30 | 2.29 | 3.9 | 0.4 | 14 |
| Example9 | HPMC | 1000 | 9.5 | 50 | 75 | 0.30 | 3.81 | 3.3 | 0.7 | 32 |
| Example10 | MC | 4000 | 1.0 | 71 | 76 | 0.30 | 2.78 | 4.0 | 0.0 | 6 |
| Comp.Ex.1 | HPMC | 1000 | 9.5 | 26 | 22 | 0.30 | 2.29 | 3.8 | 1.3 | 50 |
| Comp.Ex.2 | HPMC | 1000 | 9.5 | 20 | 74 | 0.30 | 2.29 | 3.9 | 1.0 | 46 |
| Comp.Ex.3 | HPMC | 1000 | 9.5 | 70 | 24 | 0.30 | 2.29 | 3.8 | 1.3 | 46 |
| Comp.Ex.4 | HPMC | 1000 | 9.5 | 25 | 22 | 0.30 | 3.81 | 3.3 | 2.7 | 126 |

* "viscosity" means a viscosity at 20°C of 2% by mass aqueous solution of cellulose ether.

* "amount of hydrogen chloride" means a ratio (%) of mass of hydrogen chloride to absolute dry mass of cellulose ether before depolymerization.